(12) United States Patent
Jung

(10) Patent No.: US 11,867,879 B2
(45) Date of Patent: *Jan. 9, 2024

(54) OPTICAL IMAGING SYSTEM

(71) Applicant: Samsung Electro-Mechanics Co., Ltd, Suwon-si (KR)

(72) Inventor: Phil Ho Jung, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/028,266

(22) Filed: Sep. 22, 2020

(65) Prior Publication Data

US 2021/0003827 A1 Jan. 7, 2021

Related U.S. Application Data

(63) Continuation of application No. 16/139,259, filed on Sep. 24, 2018, now Pat. No. 10,823,941, which is a continuation of application No. 15/585,265, filed on May 3, 2017, now Pat. No. 10,156,703.

(30) Foreign Application Priority Data

Dec. 27, 2016 (KR) .................. 10-2016-0180325

(51) Int. Cl.
*G02B 13/00* (2006.01)
*G02B 9/62* (2006.01)

(52) U.S. Cl.
CPC .......... *G02B 13/0045* (2013.01); *G02B 9/62* (2013.01)

(58) Field of Classification Search
CPC .............................. G02B 13/0045; G02B 9/62
See application file for complete search history.

(56) References Cited

U.S. PATENT DOCUMENTS

| 9,488,803 | B2 | 11/2016 | Chen et al. |
| 9,557,534 | B1* | 1/2017 | Liao ...................... G02B 13/06 |
| 9,733,455 | B1* | 8/2017 | Liao .................. G02B 27/0025 |
| 10,156,703 | B2 | 12/2018 | Jung |
| 10,823,941 | B2* | 11/2020 | Jung ........................ G02B 9/62 |
| 2009/0251801 | A1 | 10/2009 | Jung et al. |
| 2012/0206822 | A1 | 8/2012 | Hsieh et al. |

(Continued)

FOREIGN PATENT DOCUMENTS

| CN | 105204144 A | 12/2015 |
| CN | 106199912 A | 12/2016 |

(Continued)

OTHER PUBLICATIONS

Chinese Office Action dated Nov. 26, 2019, in counterpart Chinese Patent Application No. 201710538704.8 (11 pages in English, 7 pages in Chinese).

(Continued)

*Primary Examiner* — Alicia M Harrington
(74) *Attorney, Agent, or Firm* — NSIP Law

(57) ABSTRACT

An optical imaging system includes a first lens, a second lens, a third lens, a fourth lens, a fifth lens, and a sixth lens sequentially arranged from an object side to an imaging plane. An object-side surface of the fourth lens is convex, an object-side surface of the fifth lens is concave, and an angle of view of the optical imaging system is 100 degrees or more.

12 Claims, 12 Drawing Sheets

(56) References Cited

U.S. PATENT DOCUMENTS

| | | | |
|---|---|---|---|
| 2014/0118844 A1* | 5/2014 | Tsai | G02B 13/0045 |
| | | | 359/713 |
| 2014/0247507 A1 | 9/2014 | Tsai | |
| 2014/0368931 A1* | 12/2014 | Noda | G02B 9/62 |
| | | | 359/740 |
| 2015/0116572 A1 | 4/2015 | Liao | |
| 2015/0268446 A1* | 9/2015 | Chen | G02B 9/62 |
| | | | 348/148 |
| 2016/0033743 A1 | 2/2016 | Chen | |
| 2016/0097916 A1* | 4/2016 | Tang | G02B 9/62 |
| | | | 359/713 |
| 2016/0124185 A1* | 5/2016 | Tang | G02B 13/0045 |
| | | | 359/713 |
| 2016/0147044 A1 | 5/2016 | Kondo | |
| 2016/0161709 A1 | 6/2016 | Hsueh et al. | |
| 2016/0178871 A1 | 6/2016 | You | |
| 2016/0223796 A1 | 8/2016 | Lee et al. | |
| 2016/0223797 A1 | 8/2016 | Zhao | |
| 2016/0252709 A1 | 9/2016 | Lin et al. | |
| 2016/0282585 A1* | 9/2016 | Shih | G02B 13/0045 |
| 2016/0341935 A1 | 11/2016 | Chen et al. | |
| 2017/0108666 A1 | 4/2017 | Lee | |
| 2017/0115470 A1* | 4/2017 | Liao | G02B 9/60 |
| 2017/0153448 A1* | 6/2017 | Mori | G02B 13/0045 |
| 2017/0269342 A1* | 9/2017 | Jung | G02B 13/06 |

FOREIGN PATENT DOCUMENTS

| | | | | |
|---|---|---|---|---|
| KR | 10-2016-0075015 A | | 6/2016 | |
| KR | 10-2016-0094215 A | | 8/2016 | |
| KR | 10-2016-0095935 A | | 8/2016 | |
| KR | 20170108659 A | * | 9/2017 | G02B 9/62 |

OTHER PUBLICATIONS

U.S. Appl. No. 16/139,259, filed Sep. 24, 2018, Phil Ho Jung, Samsung Electro-Mechanics Co., Ltd.

* cited by examiner

| SURFACE NUMBER | RADIUS OF CURVATURE | THICKNESS OR DISTANCE | REFRACTIVE INDEX | ABBE NUMBER |
|---|---|---|---|---|
| 1 | 4.000 | 0.261 | 1.535 | 55.7 |
| 2 | 1.030 | 0.812 | | |
| 3 | 2.20799 | 0.294 | 1.65 | 21.5 |
| 4 | 3.884 | 0.221 | | |
| 5 | 1.982 | 0.455 | 1.544 | 56.1 |
| 6 | −2.017 | 0.124 | | |
| 7 | 10.442 | 0.240 | 1.65 | 21.5 |
| 8 | 2.000 | 0.231 | | |
| 9 | −4.64840 | 0.744 | 1.544 | 56.1 |
| 10 | −0.73295 | 0.050 | | |
| 11 | 1.803 | 0.435 | 1.65 | 21.5 |
| 12 | 0.746 | 0.383 | | |
| 13 | Infinity | 0.110 | 1.517 | 64.2 |
| 14 | Infinity | 0.639 | | |
| Image | Infinity | | | |

FIG. 3

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 0 | -0.512913 | 0 | 0 | -3.914939 | 8.4999842 | 0 | 0 | 0 | -0.869225 | 0 | -5.347325 |
| 4th Order Coefficient (A) | 0.1692337 | 0.2291412 | -0.30944 | -0.327314 | 0.021965 | -0.441321 | -1.233712 | -0.6383729 | 0.213565 | 0.564139 | -0.342423 | -0.132945 |
| 6th Order Coefficient (B) | -0.198041 | -0.026303 | -0.361551 | -0.368735 | 0.4243934 | 1.3177768 | 1.2160458 | 0.71893698 | -0.261455 | -0.947119 | 0.3255356 | 0.1182567 |
| 8th Order Coefficient (C) | 0.1613164 | -0.681222 | 0.1842815 | 0.9657502 | -11.7233 | -4.731601 | -2.287776 | -0.0245367 | 0.7422254 | 1.8643925 | -0.270804 | -0.079899 |
| 10th Order Coefficient (D) | -0.08112 | 1.6750652 | 0.0481789 | 2.8588818 | 126.3693 | 16.037426 | 5.8490317 | -1.3926242 | -1.926682 | -2.004921 | 0.1583665 | 0.036635 |
| 12th Order Coefficient (E) | 0.0242123 | -1.802021 | 1.9836683 | -13.23591 | -768.6635 | -50.93424 | -13.16981 | 2.34971932 | 2.6428327 | 1.1500425 | -0.064596 | -0.0104455 |
| 14th Order Coefficient (F) | -0.003718 | 0.9074926 | -3.055428 | 23.225278 | 2407.724 | 91.699471 | -2.105235 | -1.8306087 | -1.920212 | -0.362684 | 0.0156813 | 0.0017559 |
| 16th Order Coefficient (G) | 0.0002229 | -0.172032 | 1.1811961 | -14.97581 | -3109.208 | -69.54435 | 16.978544 | 0.6097246 | 0.5725514 | 0.0513488 | 0.001641 | -0.0001125 |

FIG. 4

| SURFACE NUMBER | RADIUS OF CURVATURE | THICKNESS OR DISTANCE | REFRACTIVE INDEX | ABBE NUMBER |
|---|---|---|---|---|
| 1 | 4.000 | 0.266 | 1.535 | 55.7 |
| 2 | 1.030 | 0.865 | | |
| 3 | 2.12281 | 0.292 | 1.65 | 21.5 |
| 4 | 3.081 | 0.235 | | |
| 5 | 1.901 | 0.442 | 1.544 | 56.1 |
| 6 | −2.090 | 0.180 | | |
| 7 | 12.540 | 0.240 | 1.65 | 21.5 |
| 8 | 2.115 | 0.185 | | |
| 9 | −8.27796 | 0.885 | 1.544 | 56.1 |
| 10 | −0.76470 | 0.050 | | |
| 11 | 1.813 | 0.432 | 1.65 | 21.5 |
| 12 | 0.742 | 0.377 | | |
| 13 | Infinity | 0.110 | 1.517 | 64.2 |
| 14 | Infinity | 0.639 | | |
| Image | Infinity | | | |

FIG. 7

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 0 | -0.28864 | 0 | 0 | -3.441398 | 8.077648 | 0 | 0 | 0 | -0.765155 | 0 | -4.822921 |
| 4th Order Coefficient (A) | 0.14448935 | 0.1654019 | -0.304317 | -0.317362 | 0.0119948 | -0.292843 | -1.029392 | -0.598371 | 0.11761405 | 0.4606126 | -0.39595 | -0.169274 |
| 6th Order Coefficient (B) | -0.156450021 | -0.008669 | -0.278969 | -0.292762 | 0.5624475 | 0.7449676 | 0.7907298 | 0.7334946 | -0.2625782 | -0.704976 | 0.3635993 | 0.1529868 |
| 8th Order Coefficient (C) | 0.12973235 | -0.546664 | 0.2156247 | 1.3861968 | -13.10482 | -2.963212 | -1.912205 | -0.563246 | 0.93404569 | 1.2950395 | -0.269657 | -0.096751 |
| 10th Order Coefficient (D) | -0.06536669 | 1.3631088 | 0.089457 | -0.599117 | 138.31722 | 9.2887748 | 4.2706815 | 0.332592 | -2.2786013 | -1.401668 | 0.1349277 | 0.0392893 |
| 12th Order Coefficient (E) | 0.01930474 | -1.428233 | 1.1941768 | -1.854106 | -805.5957 | -25.9499 | -6.551139 | -0.260269 | 3.00639799 | 0.9058475 | -0.048743 | -0.010249 |
| 14th Order Coefficient (F) | -0.0029337 | 0.7056746 | -2.064909 | 4.8518094 | 2406.3377 | 45.909049 | -3.678879 | 0.2485821 | -2.1324916 | -0.341935 | 0.0114327 | 0.0015514 |
| 16th Order Coefficient (G) | 0.00017457 | -0.1334 | 0.8309696 | -3.334873 | -2930.899 | -40.9107 | 9.3043153 | -0.064901 | 0.62450756 | 0.0574769 | -0.001227 | -0.000102 |

FIG. 8

| SURFACE NUMBER | RADIUS OF CURVATURE | THICKNESS OR DISTANCE | REFRACTIVE INDEX | ABBE NUMBER |
|---|---|---|---|---|
| 1 | −7.759 | 0.235 | 1.535 | 55.7 |
| 2 | 1.364 | 0.507 | | |
| 3 | 1.20529 | 0.471 | 1.65 | 21.5 |
| 4 | 1.782 | 0.544 | | |
| 5 | 1.945 | 0.676 | 1.544 | 56.1 |
| 6 | −1.129 | 0.046 | | |
| 7 | 19.243 | 0.220 | 1.65 | 21.5 |
| 8 | 1.738 | 0.323 | | |
| 9 | −3.73277 | 0.574 | 1.544 | 56.1 |
| 10 | −0.89186 | 0.030 | | |
| 11 | 2.010 | 0.417 | 1.533 | 55.7 |
| 12 | 0.804 | 0.259 | | |
| 13 | Infinity | 0.210 | 1.517 | 64.2 |
| 14 | Infinity | 0.640 | | |
| Image | Infinity | | | |

FIG. 11

| surface# | 1 | 2 | 3 | 4 | 5 | 6 | 7 | 8 | 9 | 10 | 11 | 12 |
|---|---|---|---|---|---|---|---|---|---|---|---|---|
| Conic Constant (K) | 0 | 0 | 0 | 0 | -0.60515 | -0.13088 | 0 | -11.8362 | 15.17525 | -0.56276 | 0 | -4.28407 |
| 4th Order Coefficient (A) | 0.106463513 | -0.13561 | -0.24339 | -0.04741 | -0.10137 | -0.07451 | -0.59539 | -0.23735 | 0.251454 | 0.520588 | -0.39612 | -0.2355 |
| 6th Order Coefficient (B) | -0.04848447 | 0.180055 | 0.126645 | 0.195679 | 0.506591 | 0.039166 | 1.433179 | 0.662873 | -0.57158 | -1.06504 | -0.18469 | 0.154847 |
| 8th Order Coefficient (C) | 0.018127302 | -0.15573 | -0.07732 | -0.08948 | -7.70638 | 0.522713 | -3.76914 | -1.07242 | 1.249763 | 2.228511 | 0.836067 | -0.06501 |
| 10th Order Coefficient (D) | -0.00464809 | 0.065683 | 0.057052 | 0.039421 | 37.07658 | -8.7598 | 6.338628 | 1.145422 | -1.88116 | -2.61774 | -0.99754 | 0.009296 |
| 12th Order Coefficient (E) | 0.000663542 | 0.000855 | -0.04993 | -0.08029 | -97.7716 | 20.7551 | -9.55463 | -0.85537 | 1.642284 | 1.594708 | 0.598862 | 0.003093 |
| 14th Order Coefficient (F) | -4.00E-05 | -0.00909 | | | 86.19089 | -18.4839 | 8.171048 | 0.347849 | -0.58382 | -0.38431 | -0.17875 | -0.0015 |
| 16th Order Coefficient (G) | 0 | 0 | 0 | 0 | 0 | 0 | 0 | 0 | 2.76E-09 | 0 | 0.021035 | 0.000184 |

FIG. 12

OPTICAL IMAGING SYSTEM

CROSS-REFERENCE TO RELATED APPLICATIONS

This application is a continuation of application Ser. No. 16/139,259 filed on Sep. 24, 2018, now U.S. Pat. No. 10,823,941 issued on Nov. 3, 2020, which is a continuation of application Ser. No. 15/585,265 filed on May 3, 2017, now U.S. Pat. No. 10,156,703 issued on Dec. 18, 2018, and claims the benefit under 35 USC 119(a) of Korean Patent Application No. 10-201 6-01 80325 filed on Dec. 27, 2016, in the Korean Intellectual Property Office, the entire disclosures of which are incorporated herein by reference for all purposes.

BACKGROUND

1. Field

The following description relates to an optical imaging system.

2. Description of Related Art

In mobile terminals, camera modules have come to be provided as a standard component, enabling video calls and image capture. In addition, as the functionality of camera modules in portable terminals has gradually increased, demand for high-resolution, high-performance camera modules in portable terminals has also increased. However, because portable terminals are becoming miniaturized and lightweight, limitations in implementing high-resolution and high-performance camera modules have been encountered.

In order to implement miniature high-performance modules, the lenses of camera modules have been formed of a plastic material lighter than glass, and optical imaging systems include five or more lenses to implement high resolution. Other considerations must also be factored into the design in the case of camera modules installed on the front surfaces of portable terminals. Such camera modules use a relatively wide angle of view to capture wide-range images.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, and a sixth lens sequentially arranged from an object side to an imaging plane. An object-side surface of the fourth lens is convex along an optical axis, an object-side surface of the fifth lens is concave along the optical axis, and an angle of view of the optical imaging system is 100 degrees or more.

The optical imaging system may satisfy the expression $0.5<f/f3<5.0$, where f3 represents a focal length of the third lens is f3 and f represents a total focal length of the optical imaging system. The optical imaging system can satisfy the expression $20<v1-v6<60$, where v1 represents an Abbe number of the first lens is v1 and v6 represents an Abbe number of the sixth lens. The optical imaging system may satisfy the expression $0<TTL/FOV<0.1$, where TTL represents a distance from an object-side surface of the first lens to an imaging plane of an image sensor and FOV represents the angle of view of the optical imaging system. The optical imaging system can satisfy the expression $1.60<n4<2.10$, where n4 represents a refractive index of the fourth lens.

The optical imaging system may further include a stop disposed between the second lens and the third lens. One or both of an object-side surface or an image-side surface of the sixth lens of the optical imaging system can be aspherical.

The optical imaging system may be configured where the first lens has a negative refractive power and a convex object-side surface along the optical axis, the third lens has a positive refractive power, the fourth lens has a negative refractive power, the fifth lens has a convex image-side surface along the optical axis, and the sixth lens has a negative refractive power and a concave image-side surface along the optical axis. The optical imaging system can be configured where the first lens has a negative refractive power, the second lens has a positive refractive power, the third lens has a positive refractive power, the fourth lens has a negative refractive power, the fifth lens has a positive refractive power, and the sixth lens has a negative refractive power.

The first lens of the optical imaging system may have a negative refractive power, a convex object-side surface along the optical axis, and a concave image-side surface along the optical axis. The second lens of the optical imaging system can have a positive refractive power, a convex object-side surface along the optical axis, and a concave image-side surface along the optical axis. The third lens of the optical imaging system may have a positive refractive power and both surfaces of the third lens may be convex along the optical axis.

The fourth lens of the optical imaging system may have a negative refractive power and a concave image-side surface along the optical axis. The fifth lens of the optical imaging system can have a positive refractive power and a convex image-side surface along the optical axis. The sixth lens of the optical imaging system may have a negative refractive power, a convex object-side surface along the optical axis, and a concave image-side surface along the optical axis.

In another general aspect, an optical imaging system includes a first lens having a negative refractive power and having a convex object-side surface, a second lens, a third lens having a positive refractive power, a fourth lens having a negative refractive power, a fifth lens having a convex image-side surface, and a sixth lens having a negative refractive power and having a concave image-side surface. The first to sixth lenses are sequentially arranged from an object side to an imaging plane. The expression $0.5<f/f3<5.0$ is satisfied, where f represents a total focal length of the optical imaging system and f3 represents a focal length of the third lens.

In another general aspect, an optical imaging system includes a first lens having a concave image-side surface and a second lens, a third lens, a fourth lens, a fifth lens, and a sixth lens. The first to sixth lenses are sequentially arranged from an object side to an imaging plane. An F-number of the optical imaging system is 2.45 or less.

Other features and aspects will be apparent from the following detailed description, the drawings, and the claims.

BRIEF DESCRIPTION OF DRAWINGS

FIG. 3 is a table listing lens characteristics of the optical imaging system illustrated in FIG. 1.

FIG. 4 is a table listing aspherical coefficients of lenses of the optical imaging system illustrated in FIG. 1.

FIG. 7 is a table listing lens characteristics of the optical imaging system illustrated in FIG. 5; and FIG. 8 is a table listing aspherical coefficients of lenses of the optical imaging system illustrated in FIG. 5.

FIG. 11 is a table listing lens characteristics of the optical imaging system illustrated in FIG. 9; and FIG. 12 is a table listing aspherical coefficients of lenses of the optical imaging system illustrated in FIG. 9.

Figure 1:
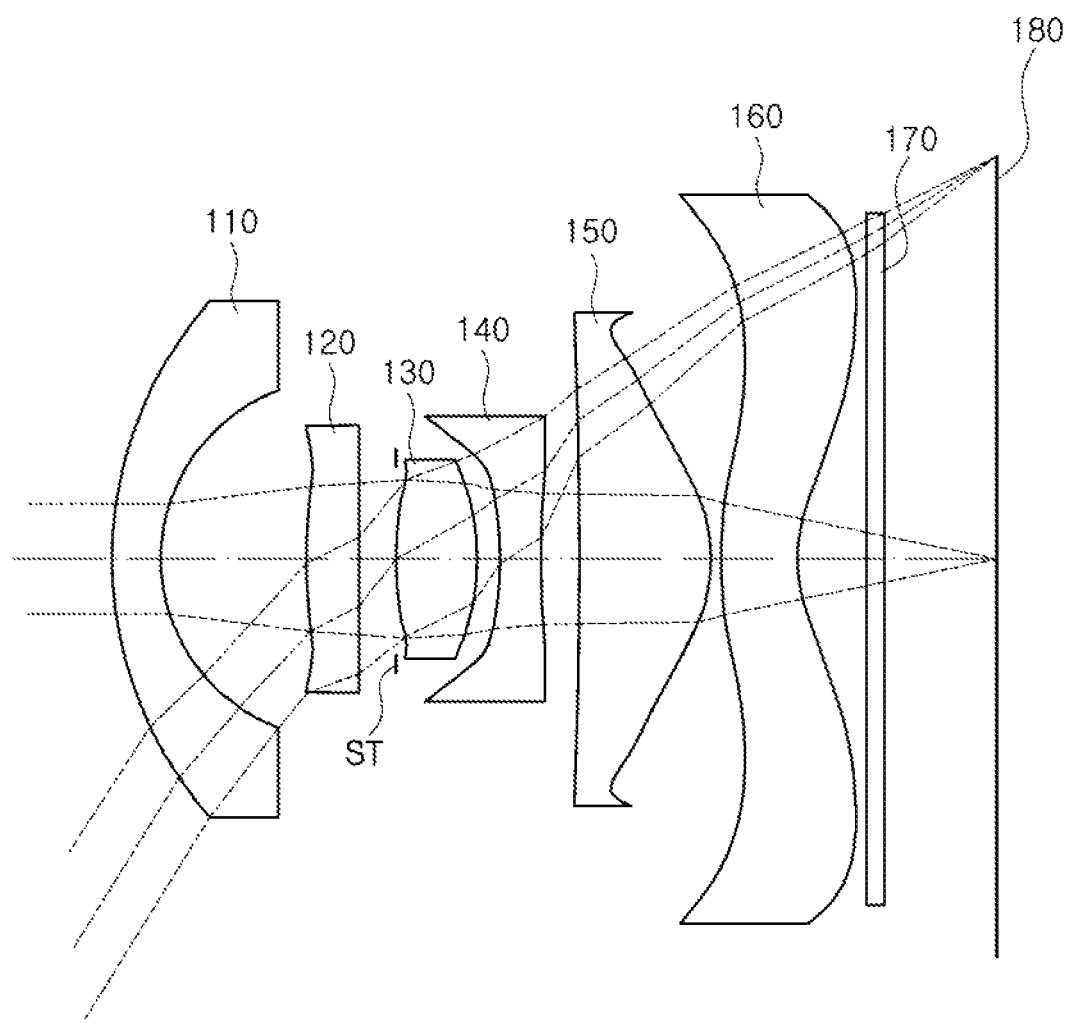
FIG. 1 is a lens configuration diagram illustrating an optical imaging system according to a first example.

Throughout the drawings and the detailed description, the same reference numerals refer to the same elements, where applicable. The drawings may not be to scale, and the relative size, proportions, and depiction of elements in the drawings may be exaggerated for clarity, illustration, or convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure. The sequences of operations described herein are merely examples, and are not limited to those set forth herein, but may be changed, as will be apparent after an understanding of the disclosure, with the exception of operations necessarily occurring in a certain order. Also, descriptions of functions and constructions that are well known may be omitted for increased clarity and conciseness.

The features described herein may be embodied in different forms, and should not be construed as being limited to the examples described herein. Rather, the examples described herein have been provided so that this disclosure will be thorough and complete, and will convey the full scope of the disclosure to one of ordinary skill in the art.

Throughout the specification, it will be understood that when an element, such as a layer, region or wafer (substrate), is referred to as being "on," "connected to," or "coupled to" another element, it can be directly "on," "connected to," or "coupled to" the other element, or other elements intervening therebetween may be present. In contrast, when an element is referred to as being "directly on," "directly connected to," or "directly coupled to" another element, there may be no elements or layers intervening therebetween. As used herein, the term "and/or" includes any and all combinations of one or more of the associated listed items.

Although terms such as "first," "second," and "third" may be used herein to describe various components, regions, or sections, these components, regions, or sections are not to be limited by these terms, unless otherwise noted. Rather, these terms are only used to distinguish one component, region, or section from another component, region, or section. Thus, a first component, region, or section referred to in examples described herein may also be referred to as a second component, region, or section without departing from the teachings of the examples.

The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

Due to manufacturing techniques and/or tolerances, variations of the shapes shown in the drawings may occur. Thus, the examples described herein are not limited to the specific shapes shown in the drawings, but include changes in shape that occur during manufacturing.

Subsequently, examples are described in further detail with reference to the accompanying drawings. Examples provide an optical imaging system allowing for device slimness, while implementing a relatively wide angle of view. Examples also provide an optical imaging system in which high resolution may be implemented while providing improved aberration correction effects. In the lens configuration diagrams, the thickness, size, and shape of lenses as illustrated may be somewhat exaggerated for ease of explanation, and shapes of spherical or aspherical surfaces illustrated in the lens configuration diagrams are only provided by way of examples, and thus, are not limited thereto.

A first lens refers to a lens closest to an object, while a sixth lens refers to a lens closest to an image sensor. In accordance with illustrative examples, the embodiments described of the optical imaging system include six lenses with a refractive power. However, the number of lenses in the optical imaging system may vary in some embodiments, for example, between two to six lenses, while achieving one or more results and benefits described below. Also, although each lens is described with a particular refractive power, a different refractive power for at least one of the lenses may be used to achieve the intended result.

In the case of respective lenses, a first surface refers to a surface (or an object-side surface) closest to an object, and a second surface refers to a surface (or an image-side surface) closest to an imaging plane. In the present specification, all of radii of curvature, thicknesses of lenses, and the like are provided in millimeters (mm), and the unit of angle of view of an optical imaging system (FOV) is degrees. A person skilled in the relevant art will appreciate that other units of measurement may be used. Further, in embodiments, all radii of curvature, thicknesses, OALs (optical axis distances from the first surface of the first lens to the image sensor), a distance on the optical axis between the stop and the image sensor (SLs), image heights (IMGHs) (image heights), and back focus lengths (BFLs) of the lenses, an overall focal length of an optical imaging system, and a focal length of each lens are indicated in millimeters (mm). Likewise, thicknesses of lenses, gaps between the lenses, OALs, TLs, SLs are distances measured based on an optical axis of the lenses.

In addition, in descriptions of shapes of respective lenses, the meaning that one surface of a lens is convex is that a portion of a paraxial region of the surface is convex, and the meaning that one surface of a lens is concave is that a portion of a paraxial region of the surface is concave. Thus, even in the case that it is described that one surface of a lens is convex, an edge portion of the lens may be concave. Similarly, even in the case that it is described that one surface of a lens is concave, an edge portion of the lens may be convex. The paraxial region refers to a relatively narrow region in the vicinity of an optical axis. In other words, a paraxial region of a lens may be convex, while the remaining portion of the lens outside the paraxial region is either convex, concave, or flat. Further, a paraxial region of a lens may be concave, while the remaining portion of the lens outside the paraxial region is either convex, concave, or flat. In addition, in an embodiment, thicknesses and radii of curvatures of lenses are measured in relation to optical axes of the corresponding lenses.

An optical imaging system according to an example includes a first lens, a second lens, a third lens, a fourth lens, a fifth lens, and a sixth lens sequentially arranged from an object side to an imaging plane. However, the optical imaging system according to examples is not limited to only being configured of lenses, but may further include other components as required. For example, the optical imaging system may further include an image sensor converting an image of an incident subject into an electric signal.

In addition, the optical imaging system may further include an infrared filter blocking infrared light. The infrared filter may be disposed between the sixth lens and the image sensor. The optical imaging system may further include a stop adjusting an amount of light. For example, the stop is disposed between the second lens and the third lens.

The first to sixth lenses configuring the optical imaging system according to an example may be formed of a plastic material. At least one lens of the first to sixth lenses has an aspherical surface. In addition, each of the first to sixth lenses may have at least one aspherical surface. For example, at least one of first and second surfaces of each of the first to sixth lenses is an aspherical surface. In this case, the aspherical surfaces of the first to sixth lenses are represented by Equation 1 below.

$$Z = \frac{cY^2}{1\sqrt{1-(1+K)c^2 Y^2}} + AY^4 + BY^6 + CY^8 + DY^{10} + EY^{12} + FY^{14} + \ldots \quad (1)$$

In Equation 1, c indicates curvature of a lens (an inverse number of a radius of curvature of a lens), K represents a conic constant, and Y indicates a distance from a certain point on an aspherical surface of a lens to an optical axis. In addition, constants A to F refer to aspherical coefficients, and Z indicates a distance between a certain point on an aspherical surface of a lens to an apex of the aspherical surface.

The optical imaging system including the first to sixth lenses may have negative, positive, positive, negative, positive, negative refractive powers sequentially from an object side to an imaging plane. The optical imaging system according to an example satisfies Conditional Expressions 1-8 below.

$0.5 < f/f3 < 5.0$ (Conditional Expression 1)

$20 < v1 - v6 < 60$ (Conditional Expression 2)

$0 < TTL/FOV < 0.1$ (Conditional Expression 3)

$1.60 < n4 < 2.10$ (Conditional Expression 4)

$3.0 < TTL/f < 4.0$ (Conditional Expression 5)

$0.7 < (R9-R10)/(R9+R10) < 0.9$ (Conditional Expression 6)

$0.5 < |f/f1| < 0.7$ (Conditional Expression 7)

$0.2 < |f1/f2| < 0.4$ (Conditional Expression 8)

In Conditional Expressions 1-8, f represents a total focal length of the optical imaging system, f3 represents a focal length of the third lens, v1 represents an Abbe number of the first lens, v6 represents an Abbe number of the sixth lens, TTL represents a distance from an object-side surface of the first lens to an imaging plane of an image sensor, FOV represents an angle of view of the optical imaging system, n4 represents a refractive index of the fourth lens, R9 represents a radius of curvature of an object-side surface of the fifth lens, R10 represents a radius of curvature of an image-side surface of the fifth lens, f1 represents a focal length of the first lens, and f2 represents a focal length of the second lens.

In an example, when an upper limit of Conditional Expression 1 is exceeded, distortion aberration is increased. In the case of being outside of a lower limit of Conditional Expression 1, the refractive power of the third lens may be decreased, causing the occurrence of curvature of an image surface thereof and thereby causing a decrease in resolution of an imaging plane peripheral portion of the image sensor.

In another example, when an upper limit of Conditional Expression 2 is exceeded, cost competitiveness of the fourth lens may be decreased. In the case of being outside of a lower limit of Conditional Expression 2, it may be difficult to correct chromatic aberrations and implement high resolving power.

As an example, when an upper limit of Conditional Expression 3 is exceeded, an overall length of an optical imaging system may be increased and thus it may be difficult to implement miniaturization. In the case of being outside of a lower limit value of Conditional Expression 3, an angle of view of the optical imaging system may be significantly decreased.

For another example, when an upper limit of Conditional Expression 4 is exceeded, cost competitiveness of the fourth lens may be decreased. In the case of being outside of a lower limit of Conditional Expression 4, it may be difficult to correct chromatic aberrations and implement high resolving power.

Hereinafter, the first to sixth lenses constituting the optical imaging system according to an example will be described. The first lens has a negative refractive power. In addition, the first lens may have a meniscus shape convex toward an object. In an embodiment, a first surface of the first lens is convex in a paraxial region, and a second surface of the first lens is concave in the paraxial region. In a different embodiment, the first lens has a shape in which both surfaces are concave. For example, the first surface and the second surface of the first lens are concave in the paraxial region.

In the case of the first lens, at least one surface of the first surface and the second surface may be aspherical. In an embodiment, both surfaces of the first lens are aspherical.

The second lens has a positive refractive power. In addition, the second lens may have a meniscus shape convex toward an object. In an embodiment, a first surface of the second lens is convex in a paraxial region, and a second surface is concave in the paraxial region. In the case of the second lens, at least one of the first surface and the second surface may be aspherical. For example, both surfaces of the second lens are aspherical.

The third lens has a positive refractive power. In addition, the third lens may have a shape in which both surfaces are convex. For example, the first surface and the second surface of the third lens are convex in the paraxial region. In the case of the third lens, at least one of the first surface and the second surface may be aspherical. In an embodiment, both surfaces of the third lens are aspherical.

The fourth lens has a negative refractive power. In addition, the fourth lens may have a meniscus shape convex toward the object. For example, a first surface of the fourth lens is convex in a paraxial region, and a second surface is concave in the paraxial region. In the case of the fourth lens, at least one of the first surface and the second surface may be aspherical. In an embodiment, both surfaces of the fourth lens are aspherical.

The fifth lens has a positive refractive power. In addition, the fifth lens may have a meniscus shape convex toward an imaging plane. For example, a first surface of the fifth lens is concave in a paraxial region, and a second surface is convex in the paraxial region. In the case of the fifth lens, at least one of the first surface and the second surface may be aspherical. In an embodiment, both surfaces of the fifth lens are aspherical.

The sixth lens has a negative refractive power. In addition, the sixth lens may have a meniscus shape convex toward the object. For example, a first surface of the sixth lens is convex in a paraxial region, and a second surface is concave in the paraxial region. In the case of the sixth lens, at least one of the first surface and the second surface may be aspherical. In an embodiment, both surfaces of the sixth lens are aspherical.

In addition, the sixth lens may have at least one inflection point formed on at least one of first and second surfaces. For example, the first surface of the sixth lens has a convex shape in the paraxial region, but concave shape toward an edge region. The second surface of the sixth lens may have a concave shape in the paraxial region, but a convex shape toward an edge region.

In the optical imaging system configured as described above, aberration correction performance may be improved because a plurality of lenses performs an aberration correction function.

Figure 2:
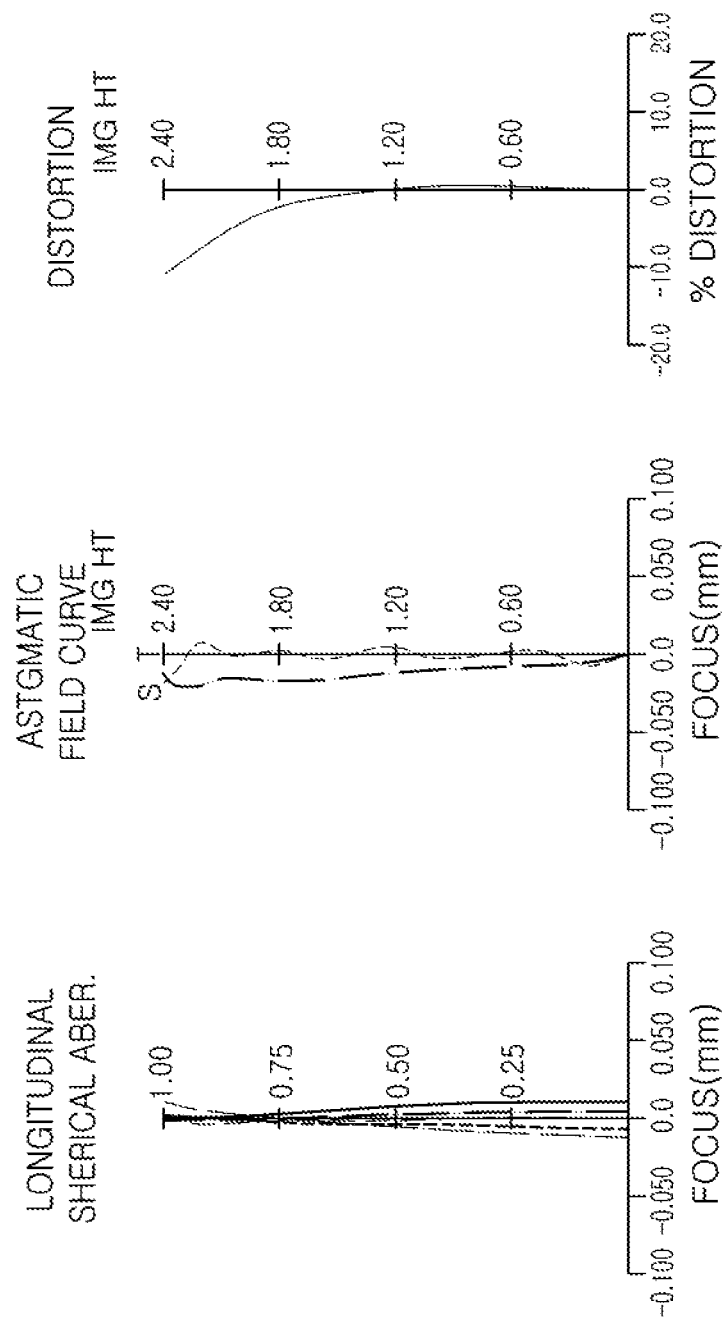
FIG. 2 is a set of graphs illustrating curves representing aberration characteristics of the optical imaging system illustrated in FIG. 1.

An optical imaging system according to a first example will be described with reference to FIGS. 1 to 4. The optical imaging system according to the first example includes a first lens 110, a second lens 120, a third lens 130, a fourth lens 140, a fifth lens 150, and a sixth lens 160. The optical imaging system according to the first example may further include a stop ST, an infrared light blocking filter 170, and an image sensor 180.

Lens characteristics of respective lenses, such as radii of curvature of lenses, lens thicknesses, distances between lenses, refractive indexes and Abbe numbers, are provided as listed in the table of FIG. 3. A total focal length f of the optical imaging system according to the first example is 1.6 mm, a focal length f1 of the first lens is −2.666 mm, a focal length f2 of the second lens is 7.278 mm, a focal length f3 of the third lens is 1.906 mm, a focal length f4 of the fourth lens is −3.807 mm, a focal length f5 of the fifth lens is 1.492 mm, and a focal length f6 of the sixth lens is −2.312 mm.

A constant F-number, indicating a brightness of the optical imaging system, is 2.4. A distance TTL from an object-side surface of the first lens to an imaging plane of the image sensor is 4.999 mm and an angle of view (FOV) of the optical imaging system is 115 degrees. A distance BFL from an image-side surface of the sixth lens to the imaging plane of the image sensor is 1.132 mm.

In the first example, first lens 110 has a negative refractive power, a first surface of first lens 110 is convex in a paraxial region, and a second surface of first lens 110 is concave in the paraxial region. The second lens 120 has a positive refractive power, a first surface of second lens 120 is convex in a paraxial region, and a second surface of second lens 120 is concave in the paraxial region. The third lens 130 has a positive refractive power, and first and second surfaces of third lens 130 are convex in a paraxial region.

The fourth lens 140 has a negative refractive power, a first surface of fourth lens 140 is convex in a paraxial region, and a second surface of fourth lens 140 is concave in the paraxial region. The fifth lens 150 has a positive refractive power, a first surface of fifth lens 150 is concave in a paraxial region, and a second surface of fifth lens 150 is convex in the paraxial region. The sixth lens 160 has a negative refractive power, a first surface of sixth lens 160 is convex in a paraxial region, and a second surface of sixth lens 160 is concave in the paraxial region. In addition, sixth lens 160 has at least one inflection point on at least one of the first surface and the second surface.

Respective surfaces of first to sixth lenses 110 to 160 have an aspherical coefficient as illustrated in FIG. 4. For example, all of object-side surfaces and image-side surfaces of first to sixth lenses 110 to 160 may be aspherical surfaces. Optionally, a stop ST may be disposed between second lens 120 and third lens 130. The optical imaging system configured as described above may have aberration characteristics as illustrated by the graphs in FIG. 2.

Figure 5:
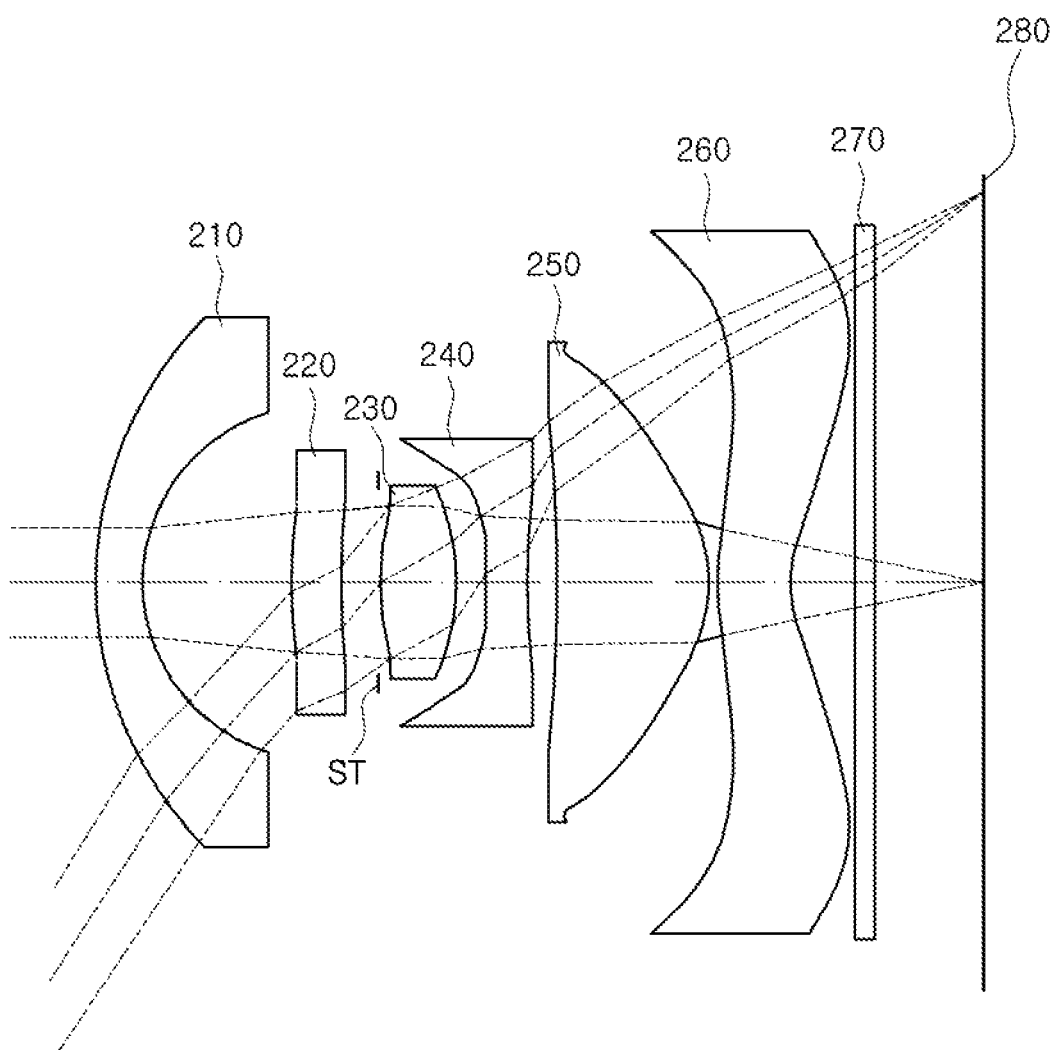
FIG. 5 is a lens configuration diagram of an optical imaging system according to a second example.
Figure 6:
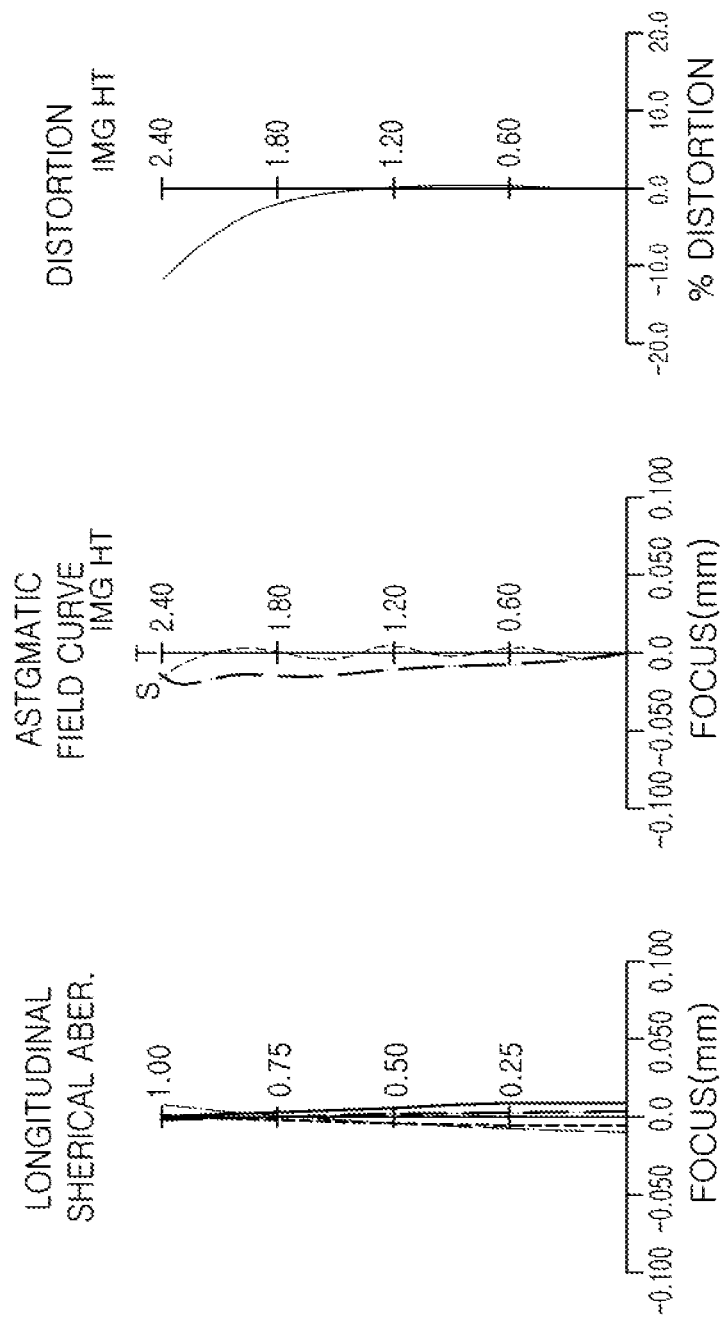
FIG. 6 is a set of graphs illustrating curves representing aberration characteristics of the optical imaging system illustrated in FIG. 5.

With reference to FIGS. 5 to 8, an optical imaging system according to a second example will be described below. The optical imaging system according to the second example includes a first lens 210, a second lens 220, a third lens 230, a fourth lens 240, a fifth lens 250, and a sixth lens 260. The optical imaging system according to the second example may further include a stop ST, an infrared light blocking filter 270, and an image sensor 280.

Lens characteristics of respective lenses, such as radii of curvature of lenses, lens thicknesses, distances between lenses, refractive indexes and Abbe numbers, are provided as listed in the table of FIG. 7. A total focal length f of the optical imaging system according to the second example is 1.6 mm, a focal length f1 of the first lens is −2.667 mm, a focal length f2 of the second lens is 9.265 mm, a focal length f3 of the third lens is 1.896 mm, a focal length f4 of the fourth lens is −3.907 mm, a focal length f5 of the fifth lens is 1.48 mm, and a focal length f6 of the sixth lens is −2.276 mm.

A constant F-number, indicating a brightness of the optical imaging system, is 2.45. A distance TTL from an object-side surface of the first lens to an imaging plane of the image sensor is 5.199 mm and an angle of view (FOV) of the optical imaging system is 115 degrees. A distance BFL from an image-side surface of the sixth lens to the imaging plane of the image sensor is 1.126 mm.

In the second example, the first lens 210 has a negative refractive power, a first surface of first lens 210 is convex in a paraxial region, and a second surface of first lens 210 is concave in the paraxial region. The second lens 220 has a positive refractive power, a first surface of second lens 220 is convex in a paraxial region, and a second surface of second lens 220 is concave in the paraxial region. The third lens 230 has a positive refractive power, and first and second surfaces of third lens 230 are convex in a paraxial region.

The fourth lens 240 has a negative refractive power, a first surface of fourth lens 240 is convex in a paraxial region, and a second surface of fourth lens 240 is concave in the paraxial region. The fifth lens 250 has a positive refractive power, a first surface of fifth lens 250 is concave in a paraxial region, and a second surface of fifth lens 250 is convex in the paraxial region. The sixth lens 260 has a negative refractive power, a first surface of sixth lens 260 is convex in a paraxial region, and a second surface of sixth lens 260 is concave in the paraxial region. In addition, sixth lens 260 has at least one inflection point on at least one of the first surface and the second surface.

Respective surfaces of first to sixth lenses 210 to 260 have an aspherical coefficient as listed in FIG. 8. For example, all of object-side surfaces and image-side surfaces of first to sixth lenses 210 to 260 are aspherical surfaces. Optionally, a stop ST may be disposed between second lens 220 and third lens 230. The optical imaging system configured as described above may have aberration characteristics as illustrated by the graphs in FIG. 6.

Figure 9:
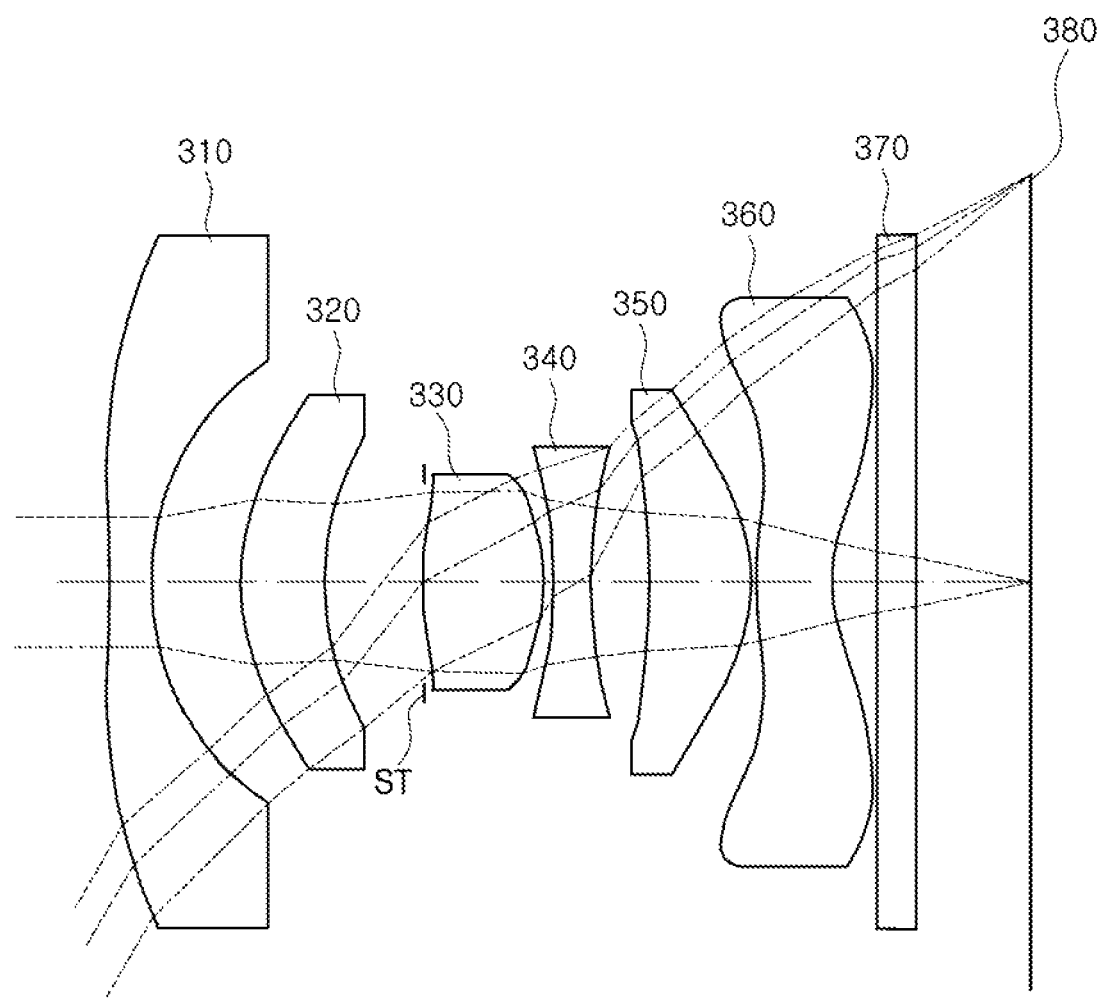
FIG. 9 is a lens configuration diagram of an optical imaging system according to a third example.
Figure 10:
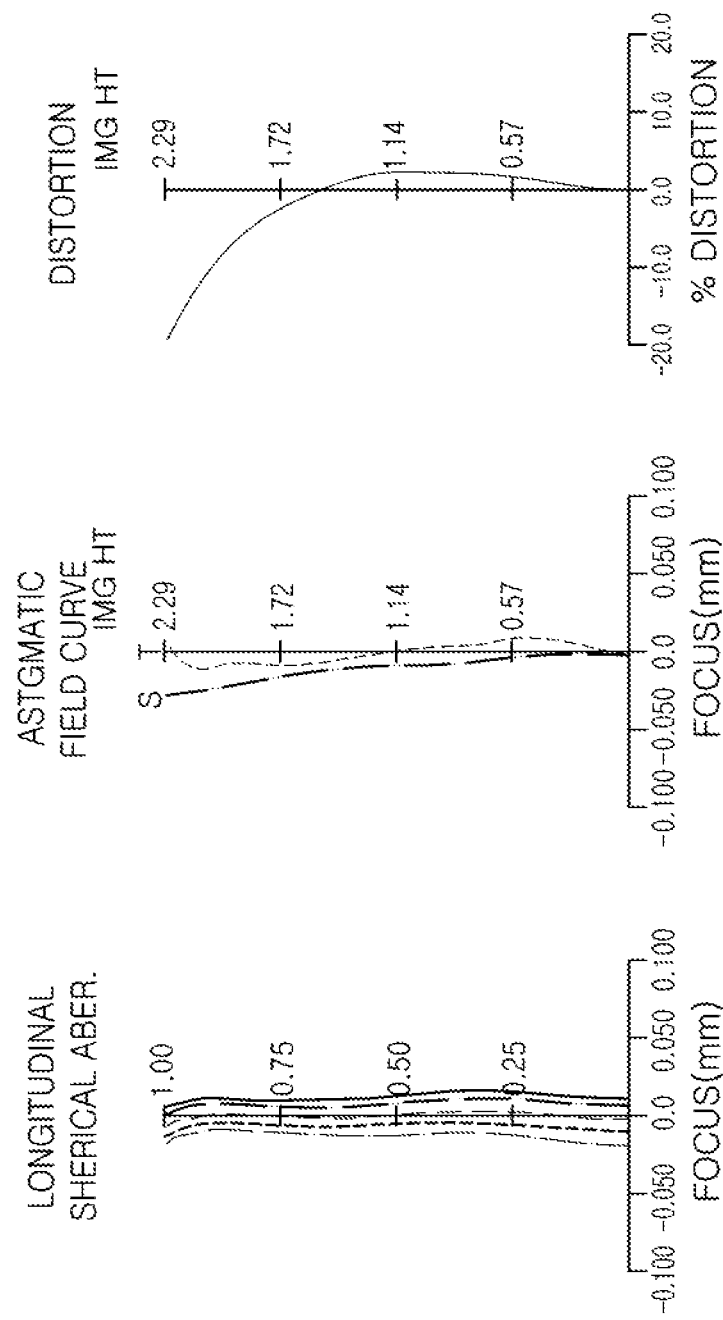
FIG. 10 is a set of graphs illustrating curves representing aberration characteristics of the optical imaging system illustrated in FIG. 9.

With reference to FIGS. 9 to 12, an optical imaging system according to a third example will be described below. The optical imaging system according to the third example includes a first lens 310, a second lens 320, a third lens 330, a fourth lens 340, a fifth lens 350, and a sixth lens 360. The optical imaging system according to the third example may further include a stop ST, an infrared light blocking filter 370, and an image sensor 380.

Lens characteristics of respective lenses, such as radii of curvature of lenses, lens thicknesses, distances between lenses, refractive indexes and Abbe numbers, are provided as listed in the table of FIG. 11. A total focal length f of the optical imaging system according to the third example is 1.645 mm, a focal length f1 of the first lens is −2.105 mm, a focal length f2 of the second lens is 4.381 mm, a focal length f3 of the third lens is 1.418 mm, a focal length f4 of the fourth lens is −2.929 mm, a focal length f5 of the fifth lens is 2.004 mm, and a focal length f6 of the sixth lens is −2.843 mm.

A constant F-number, indicating a brightness of the optical imaging system, is 2.25. A distance TTL from an object-side surface of the first lens to an imaging plane of the image sensor is 5.15 mm and an angle of view (FOV) of the optical imaging system is 120 degrees. A distance BFL from an image-side surface of the sixth lens to the imaging plane of the image sensor is 1.109 mm.

In the third example, the first lens 310 has a negative refractive power, and first and second surfaces of first lens 310 are concave in a paraxial region. The second lens 320 has a positive refractive power, a first surface of second lens 320 is convex in a paraxial region, and a second surface of second lens 320 is concave in the paraxial region. The third lens 330 has a positive refractive power, and first and second surfaces of third lens 330 are convex in a paraxial region.

The fourth lens 340 has a negative refractive power, a first surface of fourth lens 340 is convex in a paraxial region, and a second surface of fourth lens 340 is concave in the paraxial region. The fifth lens 350 has a positive refractive power, a first surface of fifth lens 350 is concave in a paraxial region, and a second surface of fifth lens 350 is convex in the paraxial region. The sixth lens 360 has a negative refractive power, a first surface of sixth lens 360 is convex in a paraxial region, and a second surface of sixth lens 360 is concave in the paraxial region. In addition, sixth lens 360 has at least one inflection point on at least one of the first surface and the second surface thereof.

Respective surfaces of first to sixth lenses 310 to 360 have an aspherical coefficient as listed in FIG. 12. For example, all of object-side surfaces and image-side surfaces of first to sixth lenses 310 to 360 are aspherical surfaces. Optionally, a stop ST may be disposed between second lens 320 and third lens 330. The optical imaging system configured as described above may have aberration characteristics as illustrated by the graphs in FIG. 10.

As set forth above, in the case of an optical imaging system according to an example, a slim optical imaging system may be implemented while having a relatively wide angle of view. In addition, relatively high resolution may be implemented while providing improved aberration correction effects.

While this disclosure includes specific examples, it will be apparent after an understanding of the application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples.

Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:
    a first lens having a negative refractive power and a concave image-side surface along an optical axis;
    a second lens having a positive refractive power and a concave image-side surface along the optical axis;
    a third lens having a refractive power and a convex object-side surface along the optical axis;
    a fourth lens having refractive power and a convex object-side surface along the optical axis;
    a fifth lens having positive refractive power, a concave object-side surface along the optical axis, and a convex image-side surface along the optical axis; and
    a sixth lens having a negative refractive power,
    wherein the first to sixth lenses are sequentially arranged in ascending numerical order along an optical axis from an object side of the optical imaging system toward an imaging plane of the optical imaging system, and
    $0.2 < |f1/f2| < 0.4$ is satisfied, where f1 is a focal length of the first lens and f2 is a focal length of the second lens.

2. The optical imaging system of claim 1, wherein the first lens has a convex object-side surface along the optical axis.

3. The optical imaging system of claim 1, wherein the second lens has a convex object-side surface along the optical axis.

4. The optical imaging system of claim 1, wherein the sixth lens has a convex object-side surface along the optical axis and a concave image-side surface along the optical axis.

5. The optical imaging system of claim 1, wherein an angle of view of the optical imaging system is 100 degrees or more.

6. The optical imaging system of claim 1, wherein $20 < v1 - v6 < 60$ is satisfied, where v1 is an Abbe number of the first lens and v6 is an Abbe number of the sixth lens.

7. The optical imaging system of claim 1, wherein $0 < TTL/FOV < 0.1$ is satisfied, where TTL is a distance along the optical axis from an object-side surface of the first lens to the imaging plane and FOV is an angle of view of the optical imaging system.

8. An optical imaging system comprising:
a first lens having a negative refractive power;
a second lens having a meniscus shape and a refractive power;
a third lens having a positive refractive power;
a fourth lens having a refractive power;
a fifth lens having a refractive power; and
a sixth lens having a refractive power,
wherein the first to sixth lenses are sequentially arranged in ascending numerical order along an optical axis from an object side of the optical imaging system toward an imaging plane of the optical imaging system,
wherein 0<TTL/FOV<0.1, where TTL is a distance along the optical axis from an object-side surface of the first lens to the imaging plane and FOV is an angle of view of the optical imaging system,
wherein 0.7<(R9−R10)/(R9+R10)<0.9, where R9 is a radius of curvature of an object-side surface of the fifth lens and R10 is a radius of curvature of an image-side surface of the fifth lens,
wherein 3.0<TTL/f<4.0, where f is a total focal length of the optical imaging system, and
wherein 20<v1−v6<60, where v1 is an Abbe number of the first lens and v6 is an Abbe number of the sixth lens.

9. The optical imaging system of claim 8, wherein 0.2<|f1/f2|<0.4, where f1 is a focal length of the first lens and f2 is a focal length of the second lens.

10. The optical imaging system of claim 8, wherein 0.5<|f/f1|<0.7, where f1 is a focal length of the first lens.

11. An optical imaging system comprising:
a first lens having a negative refractive power;
a second lens having a meniscus shape and a refractive power;
a third lens having a positive refractive power;
a fourth lens having a refractive power;
a fifth lens having a refractive power; and
a sixth lens having a refractive power,
wherein the first to sixth lenses are sequentially arranged in ascending numerical order along an optical axis from an object side of the optical imaging system toward an imaging plane of the optical imaging system,
wherein 0<TTL/FOV<0.1, where TTL is a distance along the optical axis from an object-side surface of the first lens to the imaging plane and FOV is an angle of view of the optical imaging system,
wherein 0.7<(R9−R10)/(R9+R10)<0.9, where R9 is a radius of curvature of an object-side surface of the fifth lens and R10 is a radius of curvature of an image-side surface of the fifth lens,
wherein 3.0<TTL/f<4.0, where f is a total focal length of the optical imaging system, and
0.2<|f1/f2|<0.4, where f1 is a focal length of the first lens and f2 is a focal length of the second lens.

12. The optical imaging system of claim 11, wherein 20<v1−v6<60, where v1 is an Abbe number of the first lens and v6 is an Abbe number of the sixth lens.

* * * * *